US010536109B2

(12) United States Patent
Corio

(10) Patent No.: US 10,536,109 B2
(45) Date of Patent: Jan. 14, 2020

(54) CLIP-ON MOUNTING RAILS, MOUNTING BRACKETS, AND METHODS OF MOUNTING SOLAR MODULES

(71) Applicant: ARRAY TECHNOLOGIES, INC., Albuquerque, NM (US)

(72) Inventor: Ronald P. Corio, Los Ranchos, NM (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 15/618,408

(22) Filed: Jun. 9, 2017

(65) Prior Publication Data

US 2017/0359017 A1    Dec. 14, 2017

Related U.S. Application Data

(60) Provisional application No. 62/348,999, filed on Jun. 12, 2016.

(51) Int. Cl.
 *H02S 20/32* (2014.01)
 *F16M 11/10* (2006.01)
 *F16M 11/18* (2006.01)

(52) U.S. Cl.
 CPC ............. *H02S 20/32* (2014.12); *F16M 11/10* (2013.01); *F16M 11/18* (2013.01)

(58) Field of Classification Search
 CPC ......... F16M 11/10; F16M 11/18; F16B 9/023; F24S 25/12; F24S 25/634; F24S 25/636;
 (Continued)

(56) References Cited

U.S. PATENT DOCUMENTS

| 704,957 A | 7/1902 | Crrom |
|---|---|---|
| 1,832,315 A | 11/1931 | McNutty |

(Continued)

FOREIGN PATENT DOCUMENTS

| DE | 85 20 407 U1 | 9/1985 |
|---|---|---|
| DE | 100 25 538 A1 | 11/2001 |

(Continued)

OTHER PUBLICATIONS

International Search Report and Written Opinion dated Jan. 7, 2015 in International Application No. PCT/US2014/058041.

(Continued)

*Primary Examiner* — Patrick D Hawn
(74) *Attorney, Agent, or Firm* — Maschoff Brennan

(57) ABSTRACT

A snap-on mounting bracket assembly suitable for connecting a mounting rail to a torque tube is provided. The mounting bracket assembly includes an upper clamp piece and a lower clamp piece. The upper clamp piece has a first member defining a tube insertion aperture and an open bottom space and includes an upper partial fastener. The lower clamp piece has a second member with a lower partial fastener configured to mate with the upper partial fastener such that the lower clamp piece is attachable to the upper clamp piece. In exemplary embodiments, the lower clamp piece further comprises two opposing support members configured to attach to the mounting rail. Solar tracker assemblies incorporating snap-on open mounting brackets are provided. Methods of mounting framed or unframed solar modules are also described. A mounting rail is attached to an upper clamp piece of a mounting assembly. Then the upper clamp piece is snapped onto a torque tube. A lower clamp piece of the mounting assembly is then attached to the upper clamp piece by mating a lower partial fastener of the lower clamp piece with an upper partial fastener of the upper (Continued)

clamp piece. When the upper and lower clamp pieces are attached, the open bottom space is closed and the mounting rail is secured to the torque tube.

17 Claims, 15 Drawing Sheets

(58) Field of Classification Search
CPC .......... F24S 25/65; F24S 25/67; H02S 20/32; H02S 20/30; H02S 20/10; Y02E 10/47
See application file for complete search history.

(56) References Cited

U.S. PATENT DOCUMENTS

| | | | |
|---|---|---|---|
| 2,675,201 A | | 1/1959 | Friel |
| 3,026,368 A | | 3/1962 | Lindsey |
| 3,698,691 A | | 10/1972 | Brown |
| 4,019,705 A | | 4/1977 | Habuda, Sr. et al. |
| 4,061,299 A | * | 12/1977 | Kurosaki ............... F16L 3/10 248/222.12 |
| 4,065,218 A | | 12/1977 | Biggane |
| 4,089,276 A | | 5/1978 | Enos |
| 4,371,139 A | | 2/1983 | Clark |
| 5,494,245 A | * | 2/1996 | Suzuki ............... F16L 3/1075 24/487 |
| 5,863,020 A | | 1/1999 | Olson et al. |
| 7,472,876 B2 | | 1/2009 | Jones |
| 7,784,745 B2 | * | 8/2010 | Dodge ............... F16L 3/24 138/149 |
| 8,413,391 B2 | * | 4/2013 | Seery ............... F16B 2/12 52/173.3 |
| 8,413,944 B2 | | 4/2013 | Harberts et al. |
| 9,134,045 B2 | * | 9/2015 | Ashmore ............... F24S 25/617 |
| 9,281,778 B2 | | 3/2016 | Corio et al. |
| 9,551,508 B2 | * | 1/2017 | Straeter ............... F24S 25/10 |
| 9,601,645 B2 | * | 3/2017 | Seery ............... F24S 25/65 |
| 9,660,569 B2 | * | 5/2017 | Zuritis ............... F24S 25/65 |
| 9,793,852 B2 | * | 10/2017 | Almy ............... H02S 20/23 |
| 2002/0070317 A1 | | 6/2002 | Goodman |
| 2006/0138286 A1 | | 6/2006 | Connolly |
| 2010/0089389 A1 | | 4/2010 | Seery et al. |
| 2011/0073105 A1 | | 3/2011 | Tandon |
| 2011/0253190 A1 | | 10/2011 | Farnham |
| 2012/0240489 A1 | | 9/2012 | Rivera et al. |
| 2013/0061909 A1 | | 3/2013 | Jacquot |
| 2013/0153519 A1 | | 6/2013 | Ashmore et al. |
| 2013/0192150 A1 | | 8/2013 | DuPont et al. |
| 2013/0200234 A1 | | 8/2013 | Zhao et al. |
| 2013/0335877 A1 | | 12/2013 | Keller |
| 2014/0076306 A1 | | 3/2014 | Kalus et al. |
| 2014/0117190 A1 | | 5/2014 | Werner et al. |
| 2014/0246549 A1 | | 9/2014 | West et al. |
| 2015/0059826 A1 | * | 3/2015 | Reed ............... H02S 20/32 136/246 |
| 2015/0059827 A1 | | 3/2015 | Reed et al. |
| 2015/0092383 A1 | | 4/2015 | Corio et al. |
| 2015/0200621 A1 | | 7/2015 | Reed et al. |
| 2015/0234031 A1 | * | 8/2015 | Corio ............... G01S 3/7861 250/203.4 |
| 2016/0190976 A1 | | 6/2016 | Corio et al. |
| 2017/0359017 A1 | * | 12/2017 | Corio ............... H02S 20/32 |

FOREIGN PATENT DOCUMENTS

| | | |
|---|---|---|
| DE | 203 19 065 U1 | 2/2004 |
| DE | 10 2011 106 083 A1 | 12/2012 |
| WO | WO 2008/084102 A2 | 7/2008 |

OTHER PUBLICATIONS

International Preliminary Report on Patentability dated Apr. 5, 2016 in International Application No. PCT/US2014/058041.
Examination Report dated Mar. 9, 2017 in Australian Patent Application No. 2014329828.
Extended European Search Report dated May 19, 2017 in European Patent Application No. 14851397.1.
International Search Report and Written Opinion dated Aug. 1, 2017 in International Application No. PCT/US17/20558.
International Search Report and Written Opinion dated Aug. 21, 2017 in related International Application No. PCT/US2017/036710.

* cited by examiner

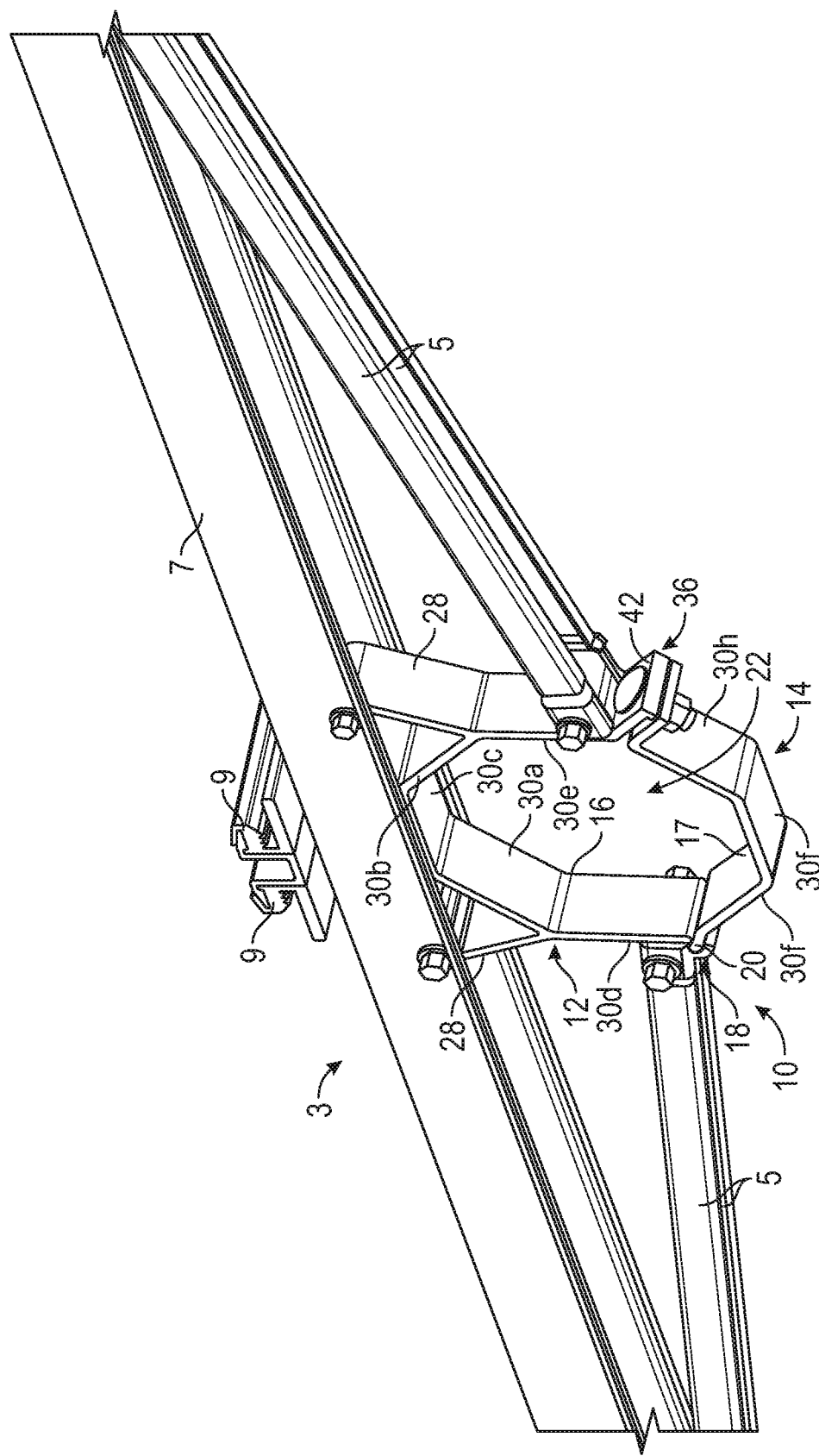

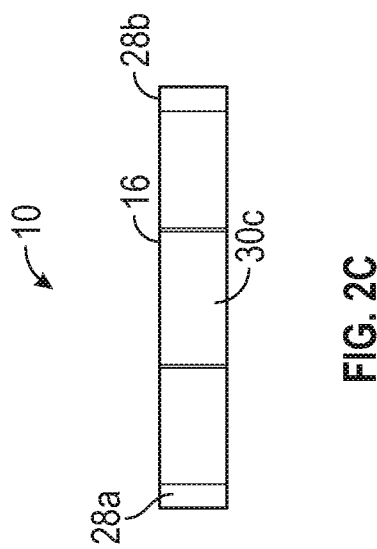
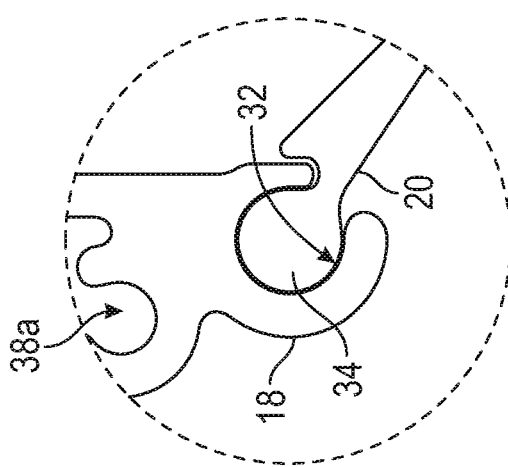
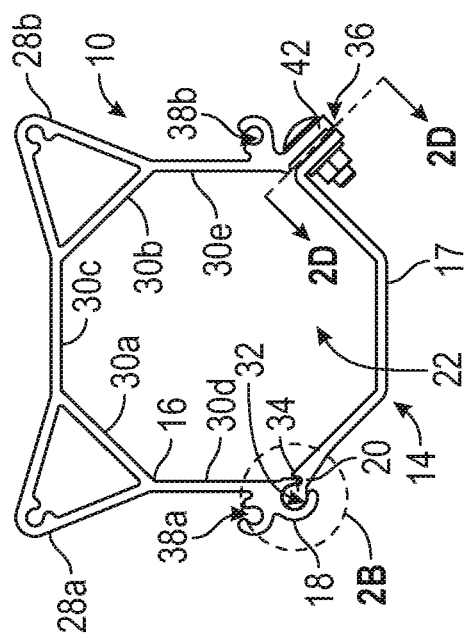
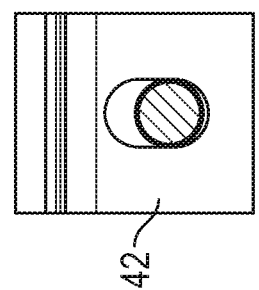

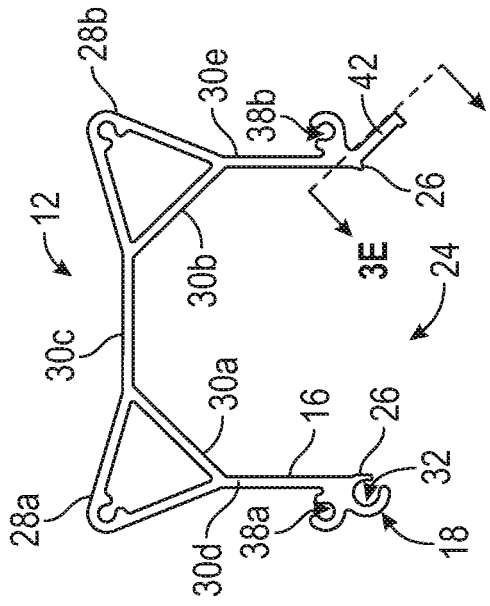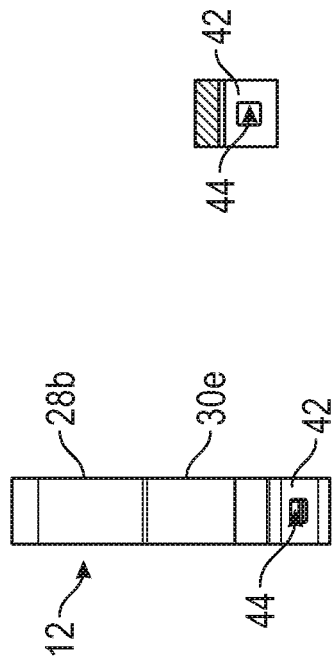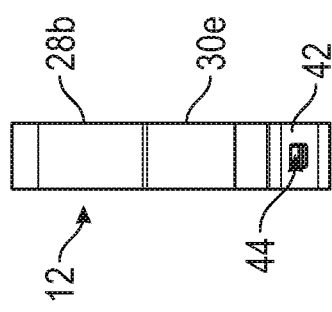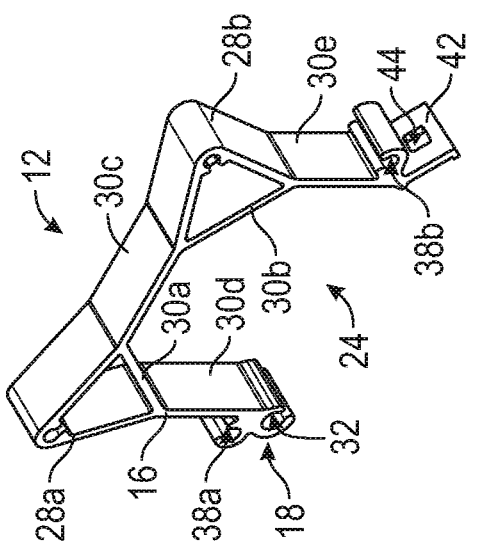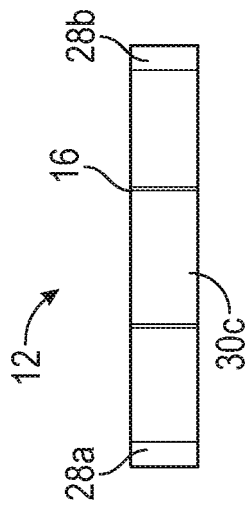

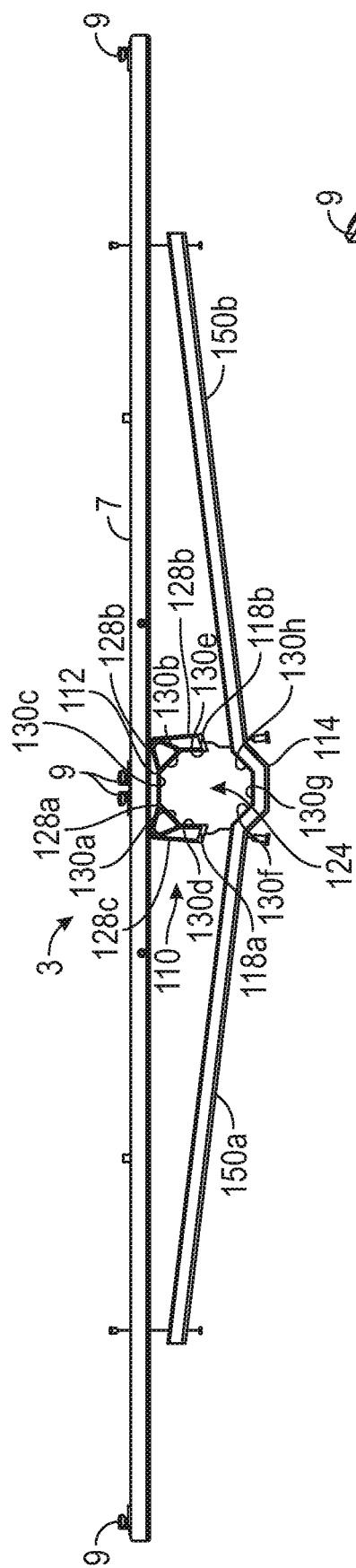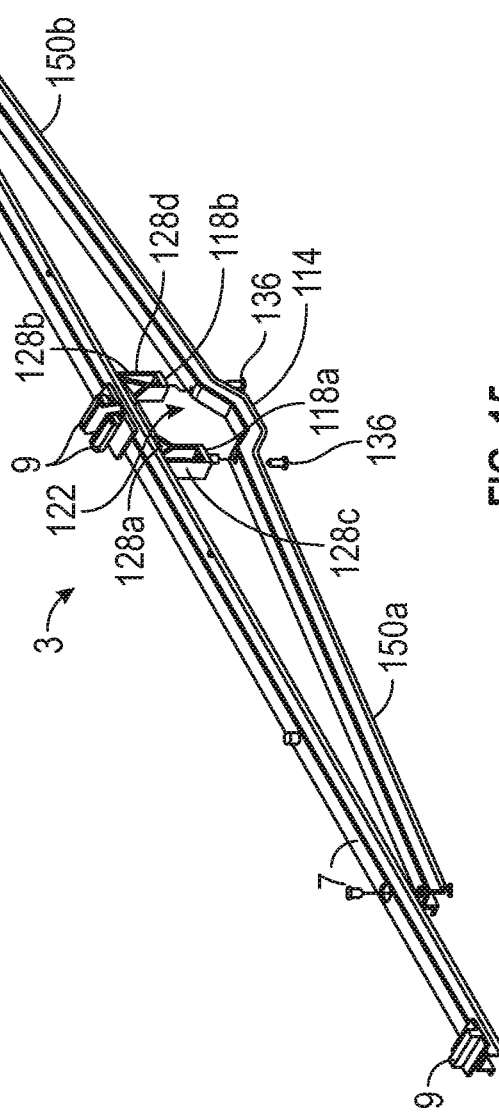

CLIP-ON MOUNTING RAILS, MOUNTING BRACKETS, AND METHODS OF MOUNTING SOLAR MODULES

CROSS-REFERENCE TO RELATED APPLICATION

This application claims priority to and benefit of U.S. patent application Ser. No. 62/348,999, filed Jun. 12, 2016, which is hereby incorporated by reference in its entirety.

FIELD

The present disclosure relates to mounting rails and mounting bracket assemblies. The present disclosure further relates to open bottom, clip-on mounting assemblies for connecting mounting rails to torque tubes.

BACKGROUND

In photovoltaic (PV) module mounting clamp designs for framed modules, the module mounting clamp is best slid over the end of the torque tube prior to installation of the tube. These standard-module mounting clamps are relatively small, usually 300-600 mm in width. The short clamps are easy to slide onto the end of the torque tube and transport well while mounted onto the torque tube across the field and therefore result in an efficient installation process.

Frameless PV modules, especially glass modules which incorporate glass as both the front and back sheets of the module are becoming more popular due to benefits such as better fire protection, improved moisture barriers, and because they exhibit less overall lifetime degradation. To mount unframed PV modules, a longer structure is required to support the unframed glass of the module. One such unframed module supporting structure consists of module mounting rails. These rails are typically fabricated from roll formed steel and may be multiple meters in length. The module mounting rails need to be attached to the torque tubes of the solar tracker. Additionally, it may be desirable to mount multiple framed modules in landscape to achieve a different aspect ratio for the array or to achieve better support for the modules in high load scenarios onto module mounting rails.

However, it is not practical to have a mount in which the installer needs to thread long mounting rails over the end of the torque tube and then transport them across the field to install as can be done with the short (0.3 meter) module mounting clamps for framed modules. The long length (2-3 meters) of the module mounting rails would hang from the torque tube and would likely get damaged during assembly and tracker installation.

In addition, while torque tubes can be any shape, octagonal is a common and advantageous shape. The octagon is a unique shape and resembles a round tube with eight flat sides. However, it is not readily suitable to attachment by a straight bolt or simple standard hardware.

Accordingly, there is a need for a mounting bracket assembly that can be placed over a torque tube at any position along the length of the tube. There is also a need for a torque tube mounting bracket that fits over an octagonal tube. In addition, a need exists for a mounting bracket assembly that facilitates attachment of mounting rails for frameless solar modules to a torque tube.

SUMMARY

Exemplary embodiments of the present disclosure alleviate to a great extent the disadvantages of known mounting bracket assemblies by providing a clip-on or snap-on two-piece torque tube mounting bracket. The mounting bracket assembly comprises an upper clamp piece with an open bottom space that can be clipped or snapped onto a torque tube and a lower clamp piece attachable to the upper clamp piece. Exemplary embodiments advantageously allow the installer to snap module mounting rails for framed or unframed solar modules onto the torque tube anywhere along the length of the tube after it is installed in the field.

Exemplary embodiments of a mounting bracket assembly comprise an upper clamp piece and a lower clamp piece. The upper clamp piece has a first member defining a tube insertion aperture and an open bottom space. The upper clamp piece has an upper partial fastener. The lower clamp piece has a second member with a lower partial fastener configured to mate with the upper partial fastener such that the lower clamp piece is attachable to the upper clamp piece. In exemplary embodiments, the lower clamp piece further comprises two opposing support members, which may be configured to attach to a mounting rail. In exemplary embodiments, the mounting bracket assembly further comprises at least one angled reinforcement feature formed on the upper clamp piece.

In exemplary embodiments, when the lower clamp piece attaches to the upper clamp piece the open bottom space is closed. The first member may have a slight return such that the upper clamp piece forms a clip or snap attachment on a torque tube. The first member may comprise five octagonal sides, and the second member may comprise three octagonal sides. In exemplary embodiments, one or both of the upper clamp piece and lower clamp piece provide a conductive ground path to a torque tube. In exemplary embodiments, the upper partial fastener is a slot and the lower partial fastener is a hinge part.

Exemplary embodiments of a solar tracker assembly comprise at least one support column, a torque tube connected to the support column, at least one mounting rail attached to the torque tube, one or more solar modules mounted to the mounting rail, and at least one mounting bracket assembly securing the at least one mounting rail to the torque tube. The mounting bracket assembly comprises an upper clamp piece and a lower clamp piece. The upper clamp piece has a first member defining a tube insertion aperture and an open bottom space. The upper clamp piece has an upper partial fastener. The lower clamp piece has a second member with a lower partial fastener configured to mate with the upper partial fastener such that the lower clamp piece is attachable to the upper clamp piece. In exemplary embodiments, the lower clamp piece further comprises two opposing support members, which may be configured to attach to the mounting rail.

In exemplary embodiments of a solar tracker assembly, when the lower clamp piece attaches to the upper clamp piece the open bottom space is closed. The first member may have a slight return such that the upper clamp piece forms a clip or snap attachment on a torque tube. One or both of the upper clamp piece and lower clamp piece may provide a conductive ground path to a torque tube. In exemplary embodiments of a solar tracker assembly, the upper partial fastener is a slot and the lower partial fastener is a hinge part. The solar tracker assembly may further comprise at least one angled reinforcement feature connected to the upper clamp piece. The solar tracker assembly may further comprise one or more solar modules mounted to the mounting rail.

Exemplary methods of mounting unframed solar modules are disclosed comprising the steps of attaching at least one mounting rail to an upper clamp piece of a mounting assembly, snapping the upper clamp piece onto a torque tube, and attaching a lower clamp piece of the mounting assembly to the upper clamp piece. The upper clamp piece defines a tube insertion aperture and an open bottom space and may include an upper partial fastener. The lower clamp piece is attached to the upper clamp piece by mating a lower partial fastener of the lower clamp piece with the upper partial fastener such that the open bottom space is closed and the at least one mounting rail is secured to the torque tube. In exemplary embodiments, the lower clamp piece further comprises two opposing support members, which may be configured to attach to the mounting rail.

Exemplary embodiments further comprise tightening a bolt and nut fastener to cinch the upper and lower clamp pieces around the torque tube. Exemplary embodiments further comprise installing at least one solar module on the at least one mounting rail. The first member may have a slight return such that the upper clamp piece forms a snap attachment on a torque tube. One or both of the upper clamp piece and lower clamp piece may provide a conductive ground path to a torque tube.

Accordingly, it is seen that mounting bracket assemblies, clip-on or snap-on mounting brackets, mounting rails, and related mounting methods are provided. The disclosed assemblies and methods provide attachment of mounting rails for solar modules to a torque tube at any position along the length of the tube. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which:

FIG. 1 is a perspective view of an exemplary embodiment of a mounting bracket assembly in accordance with the present disclosure;

FIG. 2A is a front view of an exemplary embodiment of a mounting bracket assembly in accordance with the present disclosure;

FIG. 2B is a detail view of exemplary upper and lower partial fasteners in accordance with the present disclosure;

FIG. 2C is a top view of an exemplary embodiment of a mounting bracket assembly in accordance with the present disclosure;

FIG. 2D is a detail view of an exemplary embodiment of a bolt and nut fastener in accordance with the present disclosure;

FIG. 3A is a perspective view of an exemplary embodiment of an upper clamp piece of a mounting bracket assembly in accordance with the present disclosure;

FIG. 3B is a front view of an exemplary embodiment of an upper clamp piece of a mounting bracket assembly in accordance with the present disclosure;

FIG. 3C is a top view of an exemplary embodiment of an upper clamp piece of a mounting bracket assembly in accordance with the present disclosure;

FIG. 3D is a side view of an exemplary embodiment of an upper clamp piece of a mounting bracket assembly in accordance with the present disclosure;

FIG. 3E is a detail view of an exemplary embodiment of a flange and aperture bolt and nut fastener in accordance with the present disclosure;

FIG. 14 is a front view of an exemplary embodiment of a mounting bracket assembly and mounting rails in accordance with the present disclosure;

FIG. 15 is a perspective view of an exemplary embodiment of a mounting bracket assembly and mounting rails in accordance with the present disclosure;

DETAILED DESCRIPTION

Figure 4A:
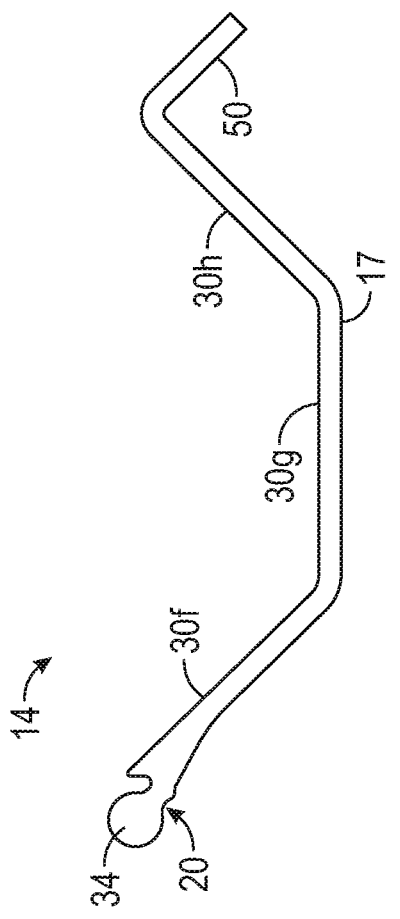
FIG. 4A is a perspective view of an exemplary embodiment of a lower clamp piece of a mounting bracket assembly in accordance with the present disclosure.
Figure 4C:
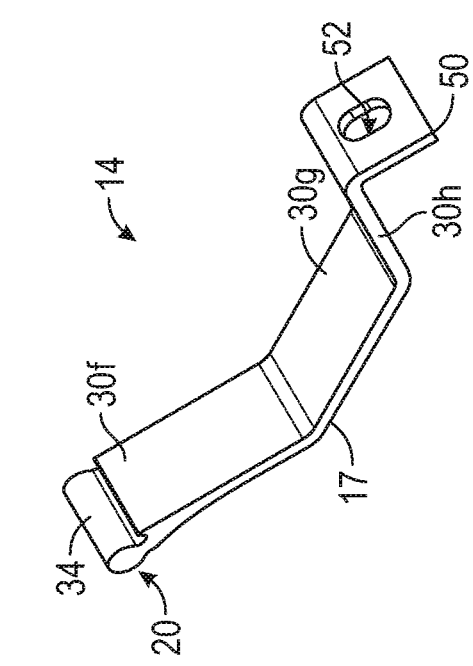
FIG. 4C is a top view of an exemplary embodiment of a lower clamp piece of a mounting bracket assembly in accordance with the present disclosure.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Referring to FIGS. 1-4E, an exemplary embodiment of a mounting bracket assembly will be described. FIG. 1 shows a mounting bracket assembly 10 incorporated into an unframed solar module supporting structure 3 comprising a module mounting rail 5. In exemplary embodiments, mounting bracket assembly 10 is an octagonal device that includes an upper clamp piece 12 comprised of a first member 16 and an upper partial fastener 18 and a lower clamp piece 14 comprised of a second member 17 that has a lower partial fastener 20. As best seen in FIGS. 2A, 2B, 3A, 3B, 4A and 4B the upper partial fastener 18 may be a slot 32 and the lower partial fastener 20 may be a corresponding hinge part 34. An extra fastening and tightening mechanism may be provided such as a bolt and nut fastener 36 to cinch the upper and lower clamp pieces 12, 14 around the torque tube.

Advantageously, the first member 16 of the upper clamp piece 12 has an open bottom space 24, best seen in FIGS. 3A and 3B. As discussed in more detail herein, the open bottom space 24 may have a slight return 26 to facilitate the mounting bracket assembly 10 to be retained over a torque tube prior to installing the lower clamp piece 14. More particularly, slight return 26 serves the function of writing around two corners of the octagonal torque tube to effectively snap over the tube and stay on the tube prior to mounting the lower clamp piece 14 of the bracket assembly 10. The assembled mounting bracket assembly 10 defines a tube insertion aperture 22 suitable for a torque tube.

As best seen in FIGS. 3A and 3B, the first member 16 of the upper clamp piece 12 is a component that constitutes the top five sides 30a-30e of the octagonally shaped mounting bracket assembly 10 with an open bottom space 24. The upper clamp piece 12 may have angled reinforcement features 28 to reinforce the mounting bracket. In exemplary embodiments, a first angled reinforcement feature 28a is formed at the top left octagonal side 30a of the upper clamp piece 12, and a second angled reinforcement feature 28b is formed at the top right octagonal side 30b of the upper clamp piece 12. The upper partial fastener 18 may be formed on either right or left octagonal sides 30d, 30e of the upper clamp piece. In exemplary embodiments, as best seen in FIG. 3B, upper partial fastener 18 is a slot 32 formed at the bottom of the left octagonal side 30d of the upper clamp piece 12. A first flange 42 defining a first aperture 44 may be provided as part of a bolt and nut fastener assembly 36. In exemplary embodiments, the first flange 42 is formed on the bottom of the right octagonal side 30e of the upper clamp piece 12.

The left octagonal side 30d of the upper clamp piece 12 may also have a first support fastener or slot 38a adjacent to the upper partial fastener 18. The first support fastener 38a provides an attachment mechanism so the mounting bracket assembly 10 can be attached to a mounting rail 5. Similarly, a second support fastener 38b formed on the right octagonal side 30e of the upper clamp piece 12 allows attachment of one or more support rails 5 on the opposite side of mounting bracket assembly 10. As seen in FIG. 1, two support rails 5 may be attached to each of the respective first and second support fasteners 38a, 38b to facilitate incorporation of the mounting bracket assembly 10 into a solar tracker or other mechanical system.

Figure 4B:
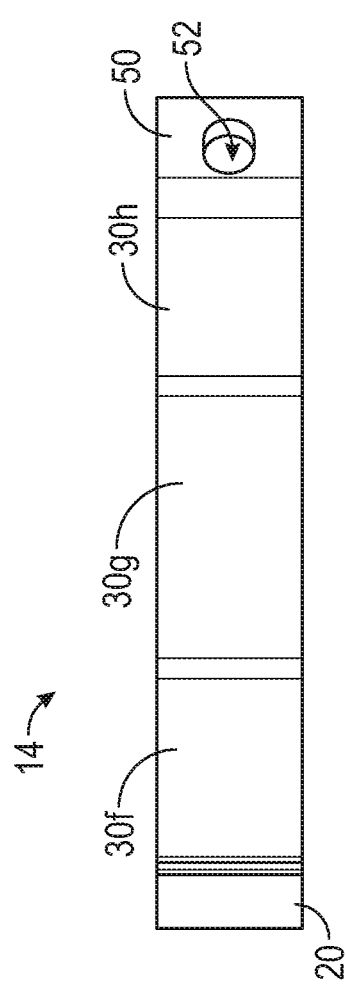
FIG. 4B is a front view of an exemplary embodiment of a lower clamp piece of a mounting bracket assembly in accordance with the present disclosure.
Figure 4D:
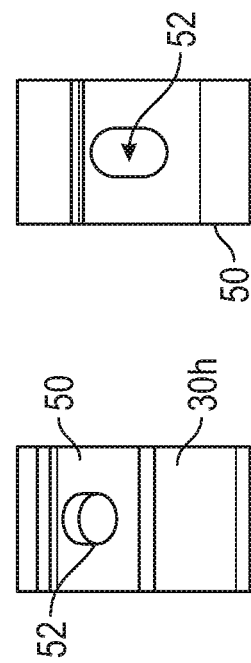
FIG. 4D is a first side view of an exemplary embodiment of a lower clamp piece of a mounting bracket assembly in accordance with the present disclosure.
Figure 4E:
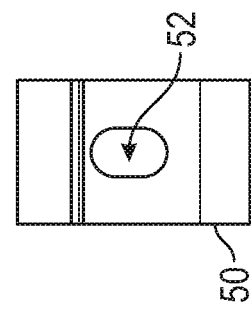
FIG. 4E is a second side view of an exemplary embodiment of a lower clamp piece of a mounting bracket assembly in accordance with the present disclosure.
Figure 5:
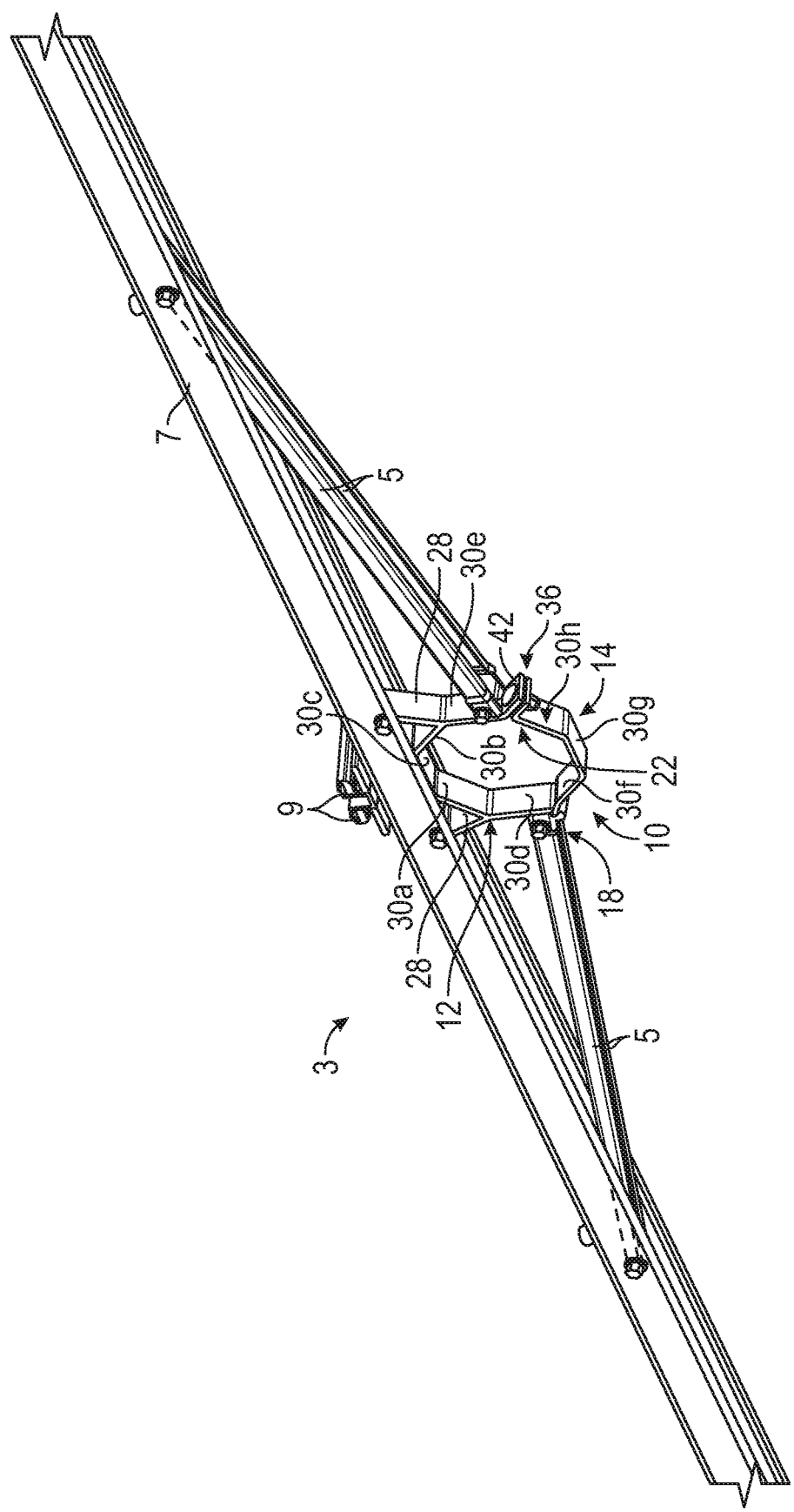
FIG. 5 is a perspective view of an exemplary embodiment of a mounting bracket assembly and mounting rails in accordance with the present disclosure.
Figure 6:
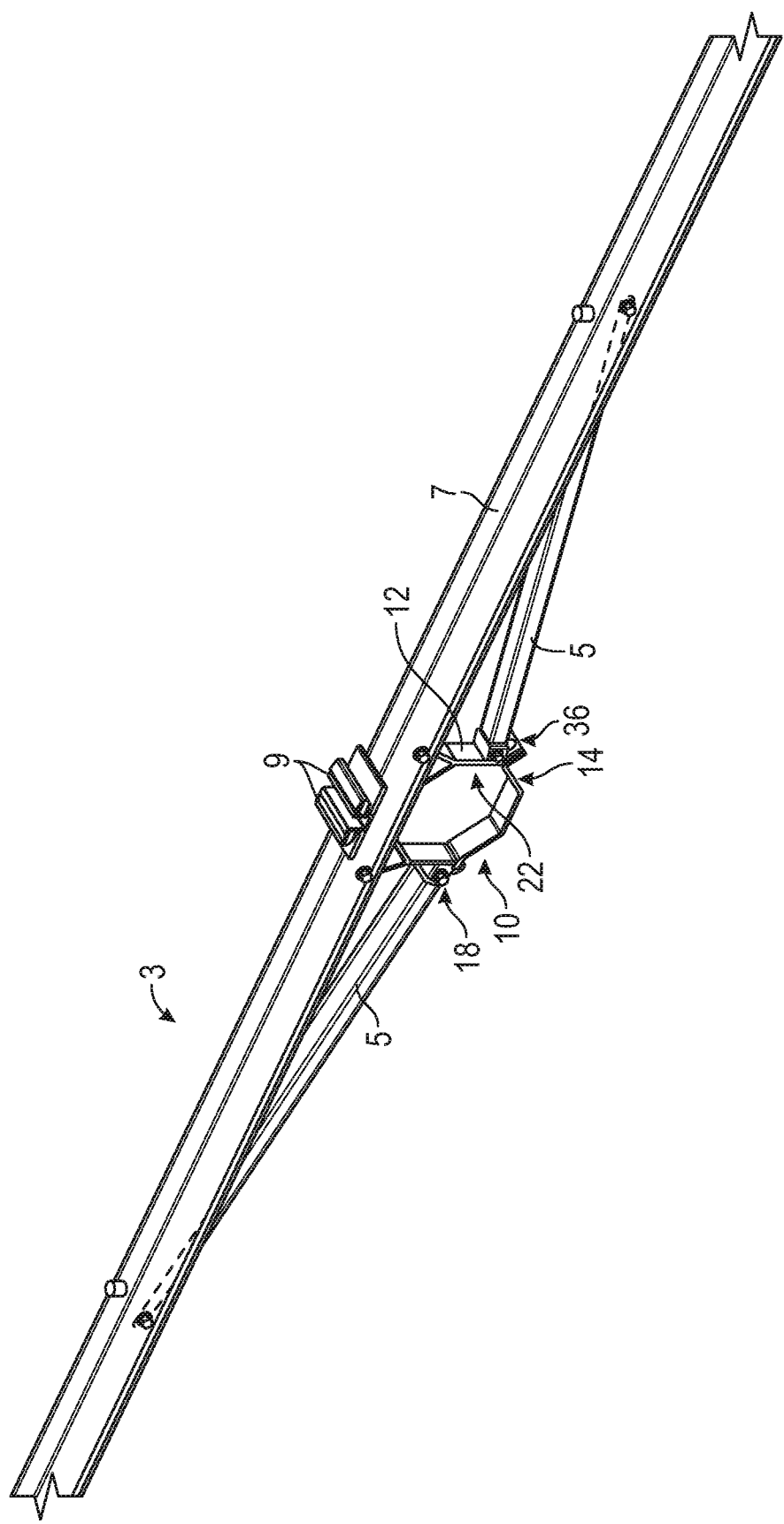
FIG. 6 is a perspective view of an exemplary embodiment of a mounting bracket assembly and mounting rails in accordance with the present disclosure.
Figure 7:
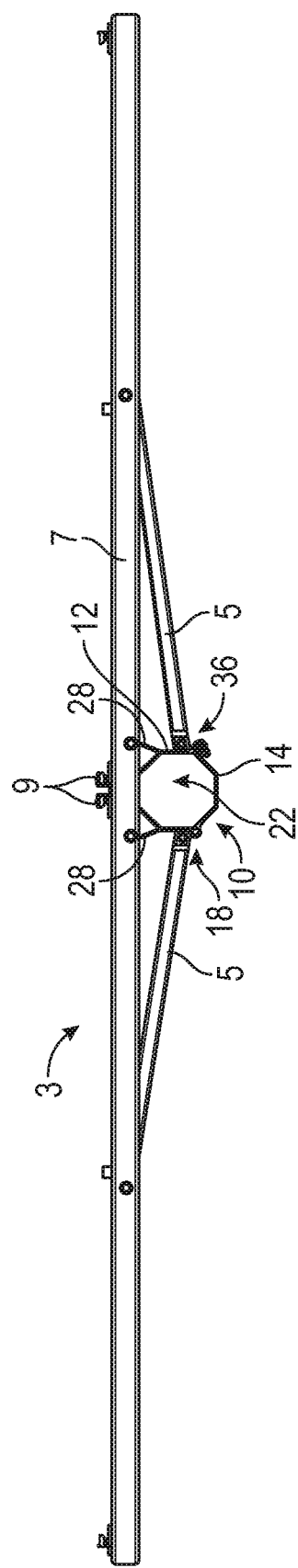
FIG. 7 is a front view of an exemplary embodiment of a mounting bracket assembly and mounting rails in accordance with the present disclosure.

Turning to FIGS. 4A and 4B, the second member 17 of the lower clamp piece 14 is a component that constitutes the bottom three sides 30f, 30g, 30h of the octagonally shaped mounting bracket assembly 10. The lower clamp piece 14 has a lower partial fastener 20, which may be formed at the top end of the lower left octagonal side 30f. In exemplary embodiments, the lower partial fastener 20 is a hinge piece 34 that matingly corresponds to the slot 32, or upper partial fastener 18, of the upper clamp piece 12. As discussed in more detail herein, hinge piece 34 can be clipped, snapped or slid into slot 32 to facilitate mounting of solar modules onto the torque tube of a solar tracker. A second flange 50 defining a second aperture 52 may be formed at the top end of the lower right octagonal side 30h. The second flange 50 mates with first flange 42 of the upper clamp piece 12 as part of the bolt and nut fastener assembly 36.

Figure 8:
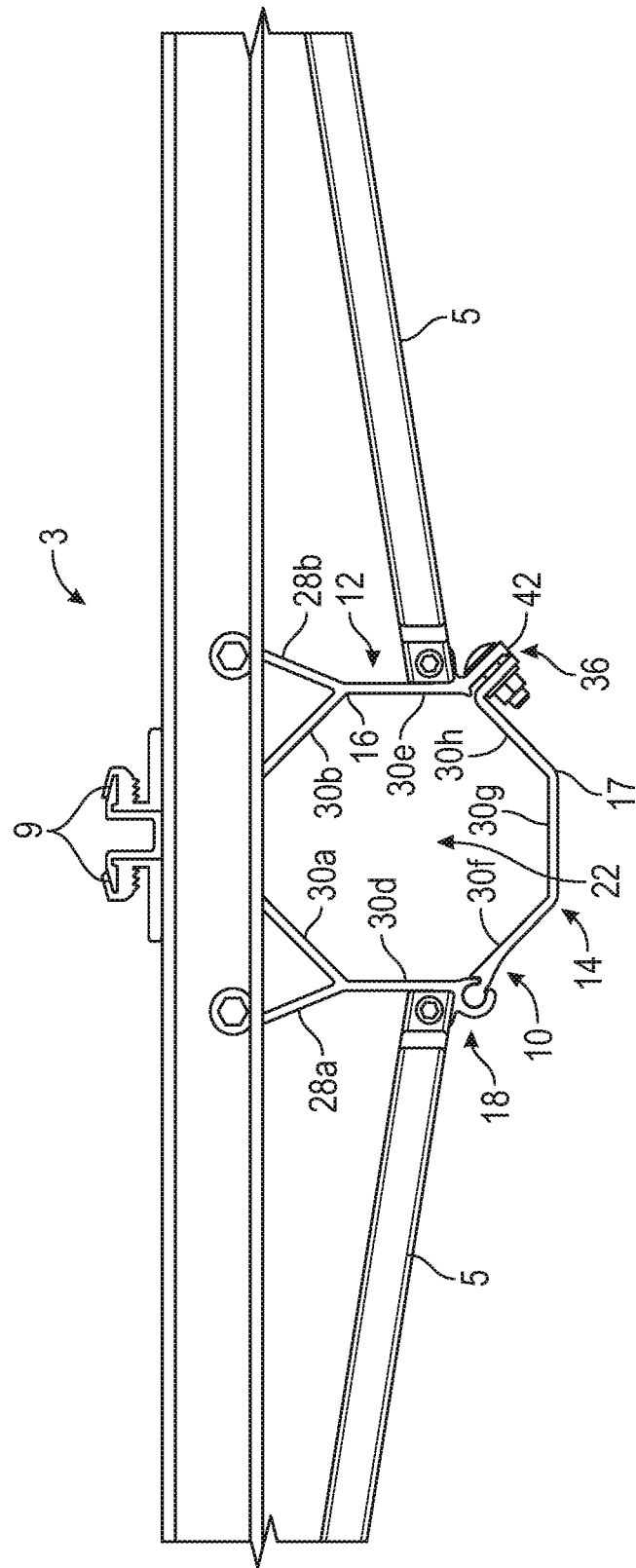
FIG. 8 is a front view of an exemplary embodiment of a mounting bracket assembly and mounting rails in accordance with the present disclosure.
Figure 9:
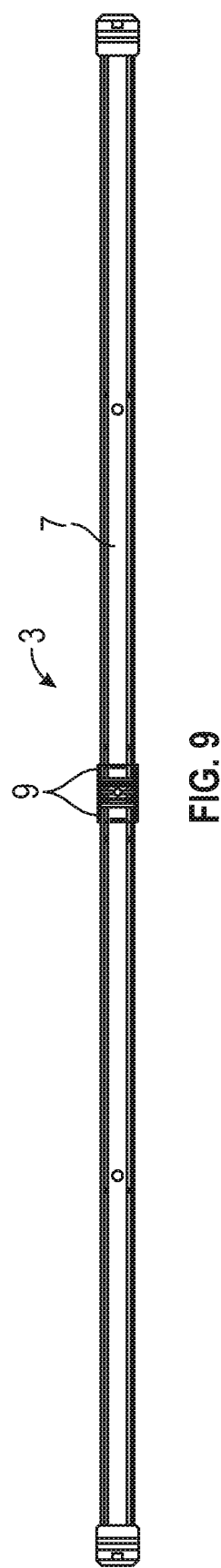
FIG. 9 is a top view of an exemplary embodiment of a mounting bracket assembly and mounting rails in accordance with the present disclosure.
Figure 10:
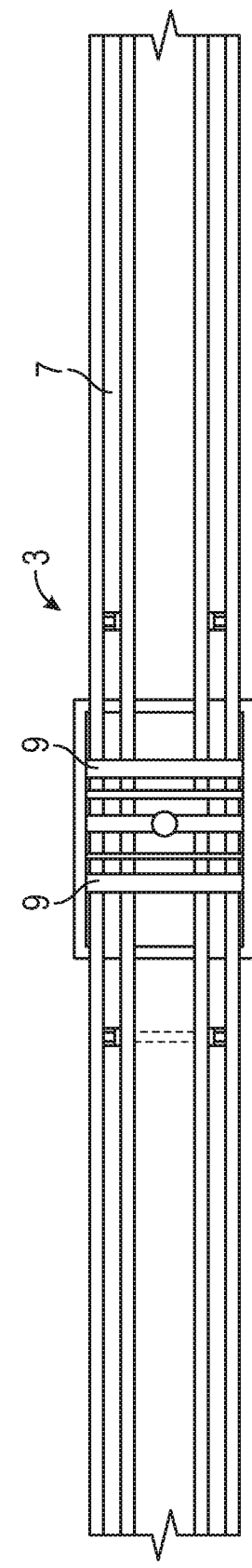
FIG. 10 is a detail top view of an exemplary embodiment of a mounting bracket assembly and mounting rails in accordance with the present disclosure.

With reference to FIGS. 2A, 2B, and 8, it can be seen that the upper clamp piece 12, with its five octagonal sides, together with the three octagonal sides of the lower clamp piece 14 form a full octagonal mounting bracket assembly. When the upper and lower clamp pieces 12, 14 are attached, the lower partial fastener 20 of the lower clamp piece 14 mates with the upper partial fastener 18. More particularly, hinge piece 34 of the lower clamp piece 14 is slid, clipped, or snapped into slot 32 of the upper clamp piece 12. Exemplary mounting brackets 10 are designed so that when the lower clamp piece 14 attaches to the upper clamp piece 12 the open bottom space 24 is closed. In the assembled or closed configuration, as shown in FIGS. 5-8, the mounting bracket assembly 10 comprising the attached upper and lower clamp pieces 12, 14 defines a tube insertion aperture 22 suitable for a torque tube.

In exemplary embodiments, the upper clamp piece 12 and/or the lower clamp piece 14 of the mounting bracket assembly 10 also provide a conductive ground path to a torque tube. More particularly, the module mounting bracket assembly 10 may provide a conductive ground path to the torque tube without any extra components because it is made from conductive material such as aluminum. In exemplary embodiments, the mounting bracket assembly is fabricated from extruded aluminum, but it may also be fabricated from formed or cast metal, or possibly high strength plastic by way of injection molding or extrusion. If coatings are used on the aluminum, to retard corrosion for example, a metal ground clip or other electrically conductive grounding means may be incorporated to pierce through the coating in to create a reliable bonded conducting path.

With reference to FIGS. 14-19, exemplary embodiments of a mounting bracket assembly 110 will now be described. These embodiments differ from the mounting bracket assembly 10 described above in that the lower clamp piece 114 here is a long beam that has two opposing support members 150a, 150b which extend and attach to the mounting rail 7, taking the place of the separate support rails 5. The upper clamp piece 112 is similar to upper clamp piece 12 in that its first member 116 is a component that constitutes the top five sides 130a-130e of the octagonally shaped mounting bracket assembly 110 with an open bottom space 124. In exemplary embodiments, the open bottom space 124 may have a slight return to facilitate the mounting bracket assembly 110 to be retained over a torque tube prior to installing the lower clamp piece 114.

The upper clamp piece 112 may have angled reinforcement features 128 to provide reinforcement to the mounting bracket. In exemplary embodiments, the upper clamp piece 112 has four reinforcement features 128 for attachment to the mounting rail 7 and additional support. First angled reinforcement feature 128a is formed at the top left octagonal side 130a, a second angled reinforcement feature 128b is formed at the top right octagonal side 130b, a third reinforcement feature 128c is formed at the left octagonal side 130d, and a fourth reinforcement feature is formed at the right octagonal side 130e. As best seen in FIG. 14, there is an upper partial fastener 118a formed in the third reinforcement feature 128c adjacent to the left octagonal side 130d of the upper clamp piece 112. Another upper partial fastener 118b is formed in the fourth reinforcement feature 128d adjacent to the left octagonal side 130d of the upper clamp piece 112. In exemplary embodiments, upper partial fasteners 118a, 118b are part of a bolt and nut fastener assembly 136, and may be slide-on nuts.

Figure 16:
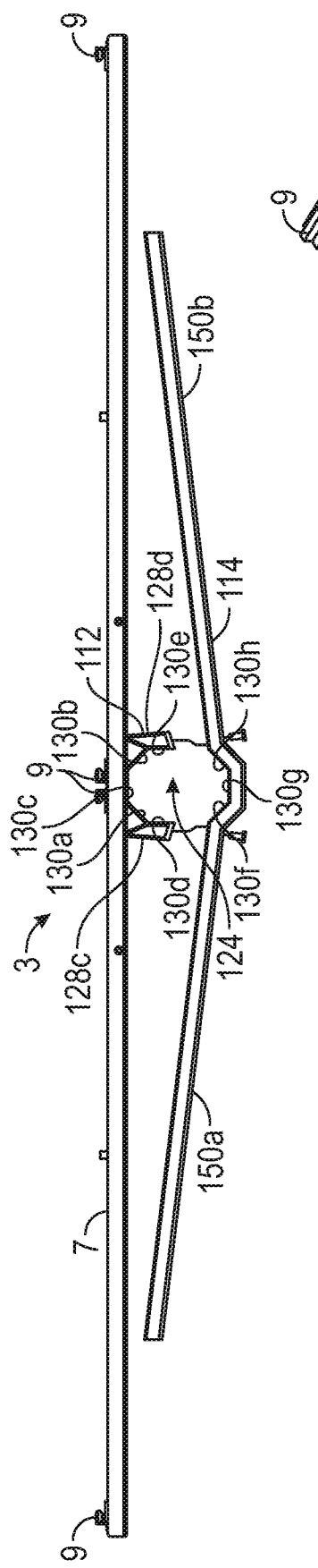
FIG. 16 is a front view of an exemplary embodiment of a mounting bracket assembly and mounting rails in accordance with the present disclosure.
Figure 17:
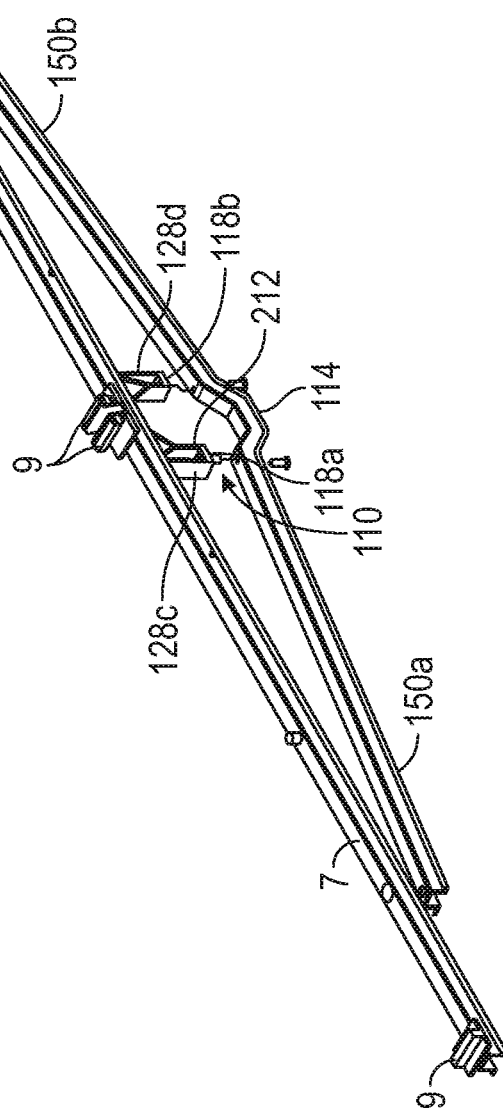
FIG. 17 is a perspective view of an exemplary embodiment of a mounting bracket assembly and mounting rails in accordance with the present disclosure.
Figure 18:
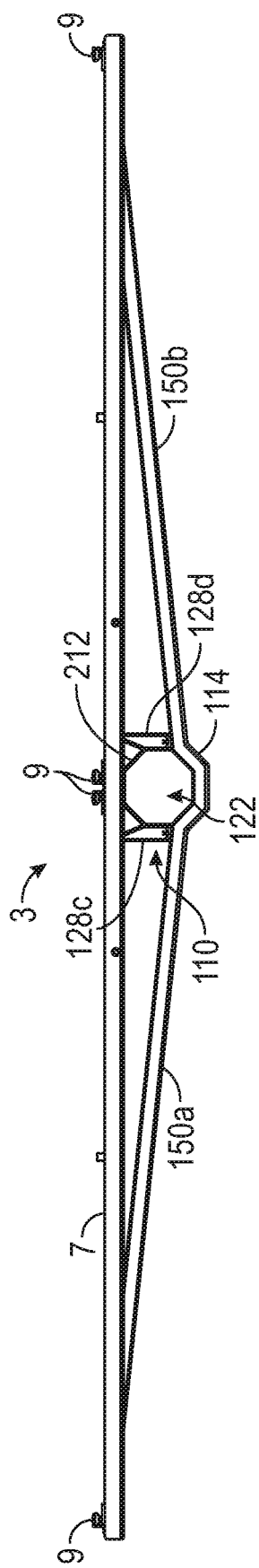
FIG. 18 a perspective view of an exemplary embodiment of a mounting bracket assembly and mounting rails in accordance with the present disclosure.
Figure 19:
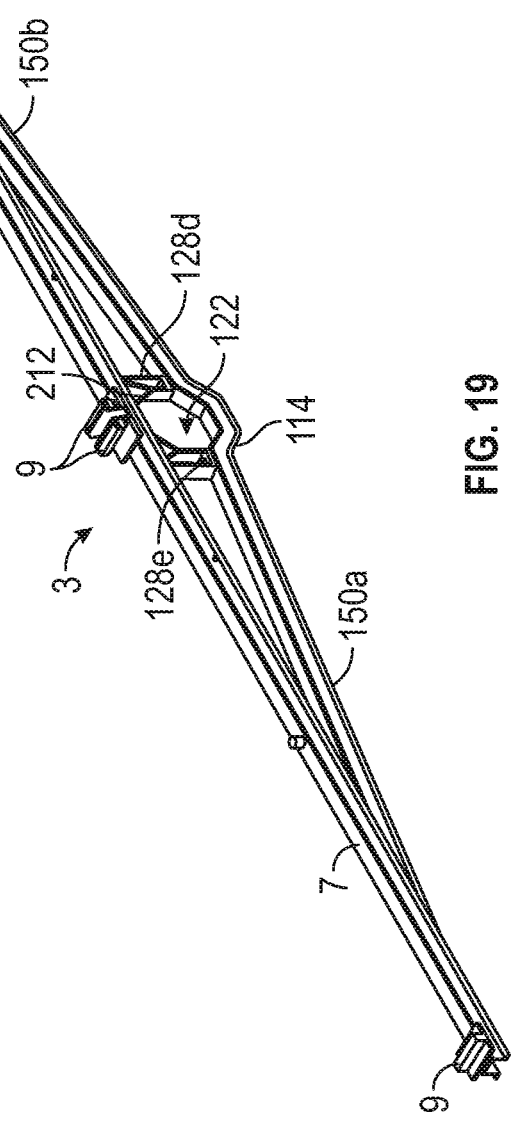
FIG. 19 a perspective view of an exemplary embodiment of a mounting bracket assembly and mounting rails in accordance with the present disclosure.

With reference to FIGS. 16-19, an exemplary embodiment of an upper clamp piece 112 has two reinforcement features 128c and 128d. More particularly, reinforcement feature 128c is formed at the left octagonal side 130d of the upper clamp piece 212, and reinforcement feature 128d is formed at the right octagonal side 130e. Without angled reinforcement features 128a and 128b, the upper clamp piece 212 and the top portions of the reinforcement features 128c and 128d provide attachment to mounting rail 7 and additional support, as best seen in FIGS. 16 and 18. In the assembled or closed configuration, as shown in FIGS. 18 and 19, the mounting bracket assembly 110 comprising the attached upper and lower clamp pieces 212, 114 defines a tube insertion aperture 122 suitable for a torque tube.

In exemplary embodiments, the second member 117 of the lower clamp piece 114 is a component that comprises the bottom three sides 130f, 130g, 130h of the octagonally shaped mounting bracket assembly 110. In addition to the bottom three sides 130f, 130g, 130h, the lower clamp piece 114 comprises two opposing support members 150a, 150b which extend and attach to the mounting rail 7 by one, two or more rivet studs or any other suitable fastener. In exemplary embodiments, the lower clamp piece 114 has two lower partial fasteners 120a and 120b, which may be bolts that mate with upper partial fasteners 118a and 118b, respectively, of the upper clamp piece 112, as part of two bolt and nut fastener assemblies 136a, 136b. In exemplary embodiments, lower partial fastener 120a is formed adjacent to the top end of the lower left octagonal side 130f, and upper partial fastener 120b is formed adjacent to the top end of the lower right octagonal side 130h. When the lower hinge piece 114 is attached to the upper clamp piece 112 the open bottom space 124 is closed. In the assembled or closed configuration, the mounting bracket assembly 110 comprising the attached upper and lower clamp pieces 112, 114 defines a tube insertion aperture suitable for a torque tube.

Figure 11:
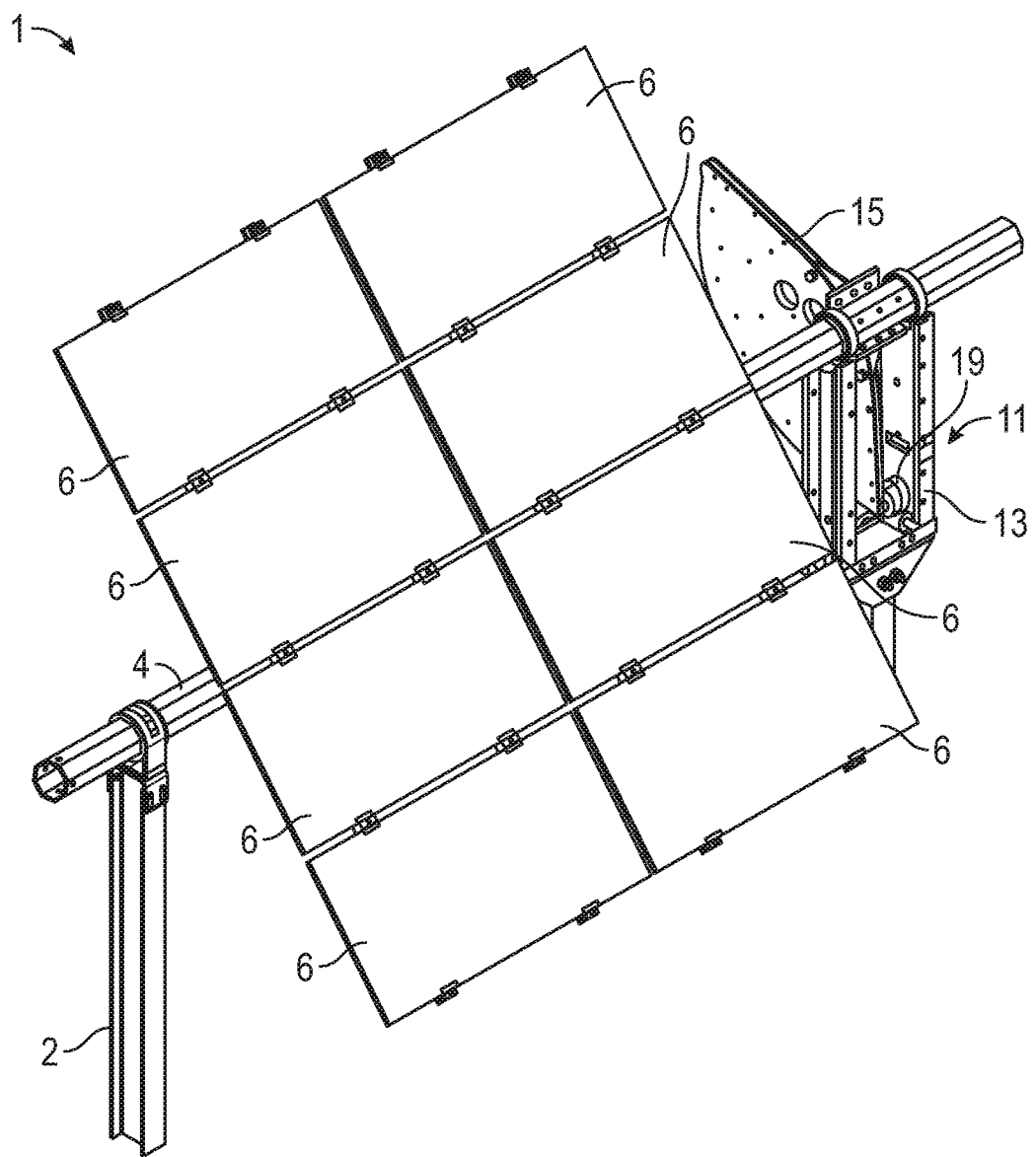
FIG. 11 is a front perspective view of an exemplary embodiment of a solar tracker assembly in accordance with the present disclosure.
Figure 12:
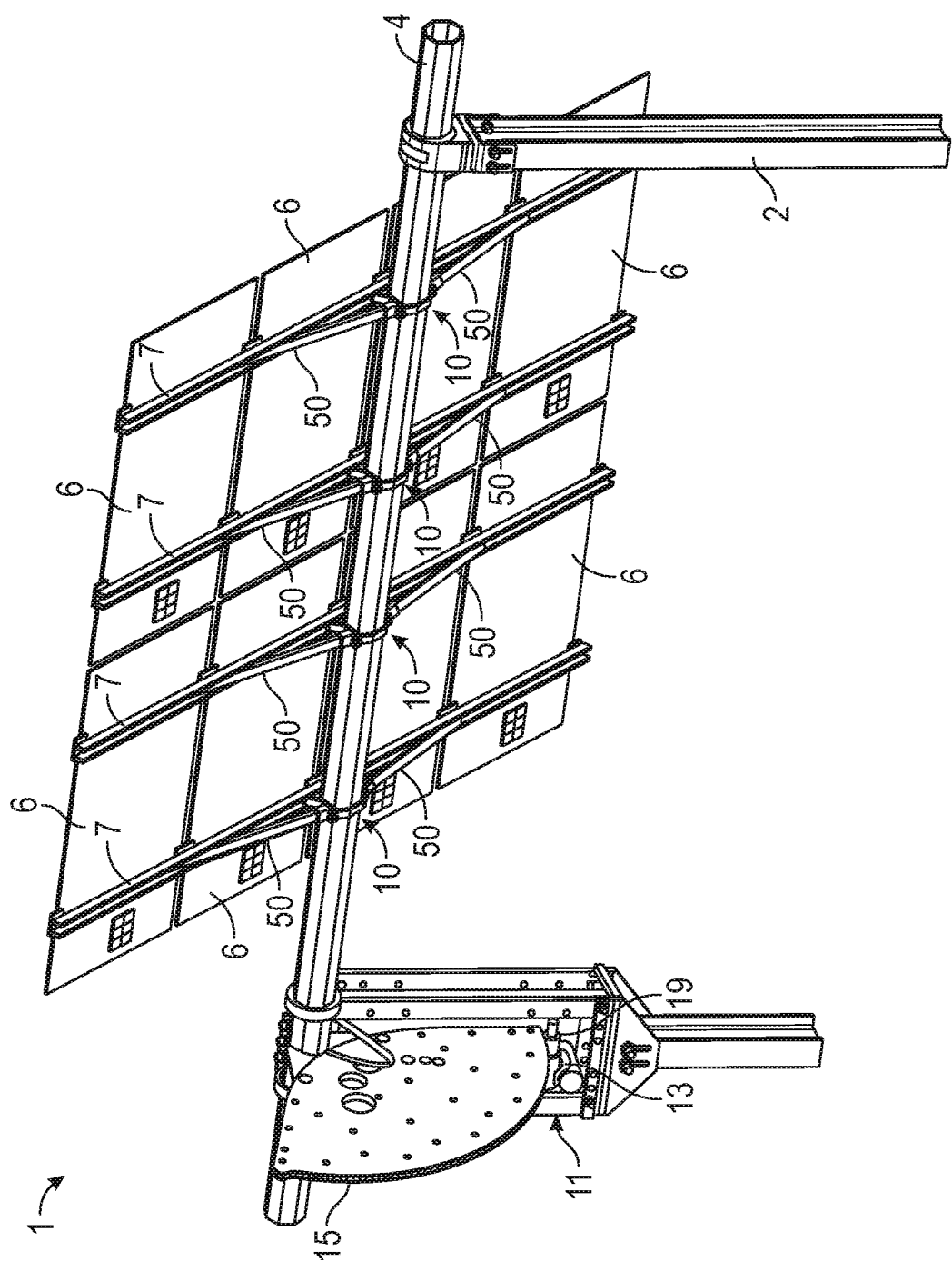
FIG. 12 is a rear perspective view of an exemplary embodiment of a solar tracker assembly in accordance with the present disclosure.
Figure 13:
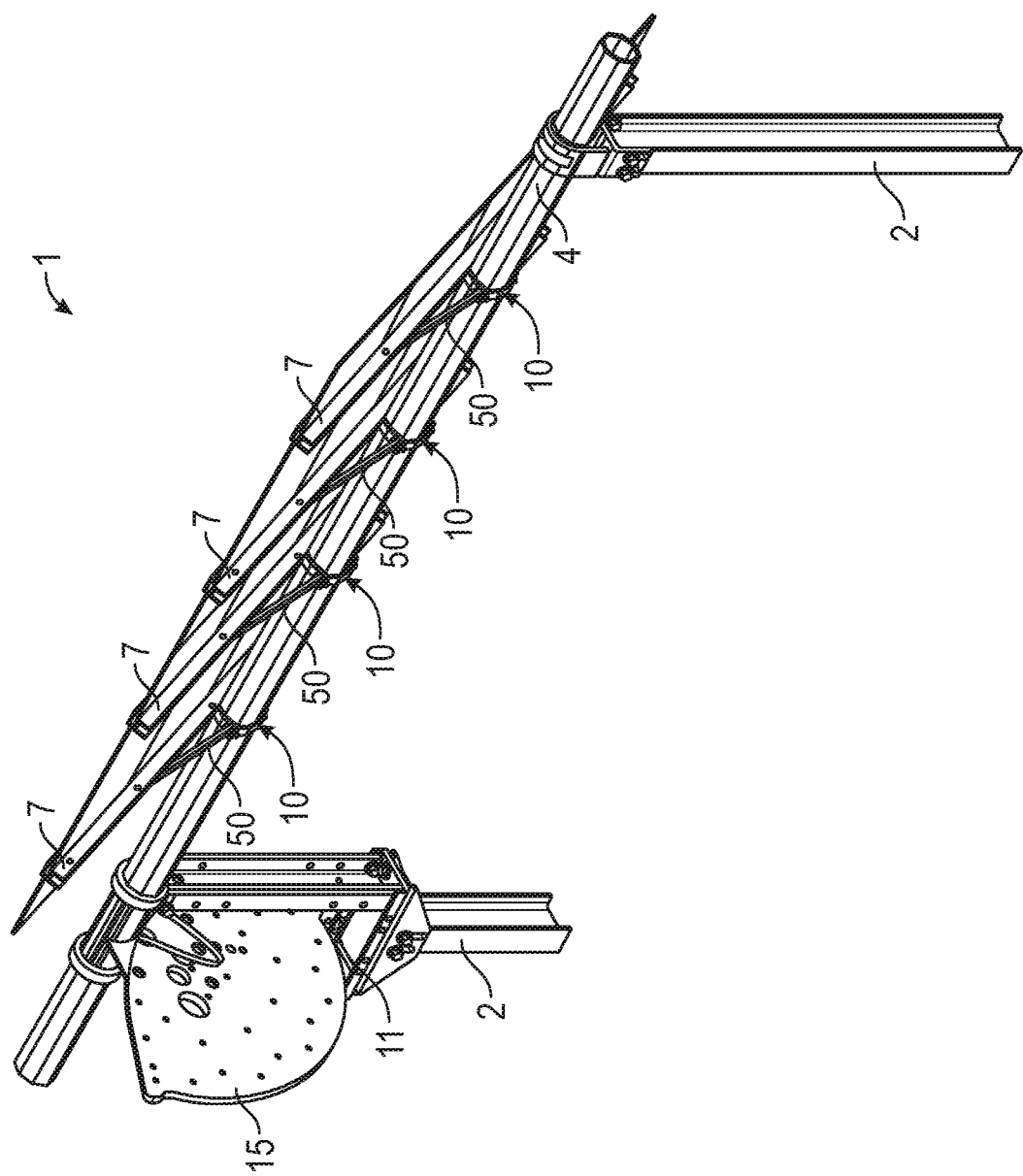
FIG. 13 is a rear perspective view of an exemplary embodiment of a solar tracker assembly in accordance with the present disclosure.

Turning to FIGS. 11-13, exemplary mounting bracket assemblies 10, 110 may be used with mounting rails for solar trackers mounting framed or frameless solar modules. A solar tracker assembly 1 includes a support column 2, a torque tube 4 connected to the support column, and one or more mounting rails 7 attached to the torque tube 4. An exemplary gear drive system 11 comprises a gear assembly 13 including at least one gear wheel 19. A motor (not shown) may be provided to drive the gear drive system 11, which in turn rotates the torsion tube 4, directly, or drives a gear rack 15, which in turn drives the torsion tube 4. The mounting rail 7 may be a support structure designed for unframed solar modules. In exemplary embodiments, the rail is a roll-formed steel module mounting rail and may be fabricated from roll formed steel and may be multiple meters in length. One or more solar modules 6 may be mounted to the mounting rail 7, and disclosed mounting bracket assemblies used to secure one more mounting rails to the torque tube 4. In exemplary embodiments, mounting clips 9 may be provided to facilitate mounting of the solar modules.

The torque tube 4 of the solar tracker 1 may be any shape. In exemplary embodiments, the torque tube has an octagonal cross section. However, the torque tube cross section could be round or partially rounded, square, rectangular, pentagonal, hexagonal, D-shaped, or any other regular or irregular shape. Accordingly, embodiments of the mounting bracket assembly may be any shape corresponding to the torque tube cross section, such as round or partially rounded, square, rectangular, pentagonal, hexagonal, D-shaped, or any other regular or irregular shape. As discussed above, the open bottom space 24 of the module mounting bracket 10 may be designed to have a slight return 26 in order to snap over the vertical sides of an octagonal torque tube or a torque tube of another cross-sectional shape.

In operation, methods of assembling a solar tracker are provided, including methods of attaching a mounting bracket assembly 10, 110 with or without support rails 5 to a torque tube 4. Advantageously, the open bottom space 24, 124 of the mounting bracket assembly 10, 110 allows the installer to attach module mounting rails 7 for unframed solar modules 6 onto the torque tube 4 anywhere along the length of the tube after it is installed in the field. First, the installer attaches a support rail 5 to the upper clamp piece 12 of the mounting bracket assembly 10. More particularly, the installer connects a first support rail 5 to the first support fastener or slot 38a on the left octagonal side 30d of the upper clamp piece 12. Similarly, the installer may connect a second support rail 5 to the second support fastener 38b on the right octagonal side 30e of the upper clamp piece 12. The support rails 5 could be secured to the upper clamp piece 12 of the mounting bracket assembly 10 by any suitable fastening mechanism such as a bolt and nut fastener.

Next, the installer clips or snaps upper clamp piece 12 of the mounting bracket assembly 10 onto the torque tube 4. More particularly, the slight return of the open bottom space 24 allows the installer to clip or snap the upper clamp piece 12 of the mounting bracket assembly 10 over the vertical sides of the octagonal torque tube 4 to stay in position on the tube until full assembly is completed. The installer then attaches the lower clamp piece 14 of the mounting bracket assembly 10 to the upper clamp piece 12. The lower clamp piece 14 is attached to the upper clamp piece 12 by mating the lower partial fastener 20 of the lower clamp piece 14 with the upper partial fastener 18 of the upper clamp piece 12. More particularly, hinge piece 34 of the lower clamp piece 14 is slid or snapped into slot 32 of the upper clamp piece 12. This results in the open bottom space 24 being closed to form a tube insertion aperture 22 and the support rails 5 being secured to the torque tube 4.

The bolt and nut fastener assembly 36 may then be tightened to cinch the mounting bracket assembly 10 around the torque tube 4 and further secure the support rails 5 to the toque tube 4. More particularly, the second flange 50 and second aperture 52 at the top end of the lower right octagonal side 30h of the lower clamp piece 14 is positioned to mate with first flange 42 and first aperture 44 of the upper clamp piece 12, the bolt inserted through the apertures 44, 52, and the nut tightened.

As discussed above, the upper clamp piece 12 of the mounting bracket assembly 10 may have angled reinforcement features to provide reinforcement for the mounting bracket. The installer may secure the first angled reinforcement feature 28a at the top left octagonal side 30a of the upper clamp piece 12 and the second angled reinforcement feature 28b at the top right octagonal side 30b of the upper clamp piece 12 to the mounting rail 7 by any suitable fastening mechanism such as a bolt and nut fastener. In exemplary embodiments, the installer would install one or more solar modules on the mounting rail 7.

In operation of mounting bracket assembly 110, the installer snaps upper clamp piece 112, 212 of the mounting bracket assembly 110 onto the torque tube 4. More particularly, the slight return of the open bottom space 124 allows the installer to snap the upper clamp piece 112, 212 of the mounting bracket assembly 110 over the vertical sides of the octagonal torque tube 4 to stay in position on the tube until full assembly is completed. The installer then attaches the lower clamp piece 114 of the mounting bracket assembly 110 to the upper clamp piece 112. The lower clamp piece 114 is attached to the upper clamp piece 112, 212 by connecting the lower partial fasteners 120a, 120b to the upper partial fasteners 118a, 118b using the slide-on bolt and nut fasteners or other suitable fastening mechanism.

The installer secures the first angled reinforcement feature 128a at the top left octagonal side 130a of the upper clamp piece 112 and the second angled reinforcement feature 128b at the top right octagonal side 130b of the upper clamp piece 112 to the mounting rail 7 by any suitable fastening mechanism such as a bolt and nut fastener. The installer would also secure the lower clamp piece 114 to the mounting rail 7. More particularly, the two opposing support members 150a, 150b are connected to the mounting rail 7 by attaching the end of each respective support member 150a, 150b to the mounting rail 7 by one, two or more rivet studs or any other suitable fastener. In exemplary embodiments, the installer would install one or more solar modules on the mounting rail 7.

Thus, it is seen that improved mounting bracket assemblies, snap on mounting brackets, mounting rails, and related mounting methods are provided. It should be understood that any of the foregoing configurations and specialized components may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. An eight-sided mounting bracket assembly comprising:
   an upper clamp piece having a first member constituting top five sides of the mounting bracket assembly and defining a tube insertion aperture and an open bottom space, the upper clamp piece including an upper partial fastener formed on a first side of the upper clamp piece;
   a lower clamp piece having a second member consisting of bottom three sides of the mounting bracket assembly and having a lower partial fastener formed at a top end of a first side of the lower clamp piece, the lower partial fastener configured to mate with the upper partial fastener such that the lower clamp piece is attachable to the upper clamp piece; and
   an extra fastener at a second side of the upper clamp piece and a second side of the lower clamp piece;
   wherein when the upper and lower partial fasteners and the extra fasteners are fastened the lower clamp piece attaches to the upper claim piece and the open bottom space is closed.

2. The mounting bracket assembly of claim 1 wherein one or both of the upper clamp piece and lower clamp piece provide a conductive ground path to a torque tube.

3. The mounting bracket assembly of claim 1 wherein the upper partial fastener is a slot and the lower partial fastener is a hinge part.

4. The mounting bracket assembly of claim 1 further comprising at least one angled reinforcement feature formed on the upper clamp piece.

5. The mounting bracket assembly of claim 1 wherein the first member has a slight return consisting of a protrusion that facilitates a snap attachment of the upper clamp piece onto a torque tube.

6. The mounting bracket assembly of claim 5 comprising two slight returns, each slight return being on an opposite side of the first member.

7. A solar tracker assembly comprising:
   at least one support column;
   a torque tube connected to the support column;
   at least one mounting rail attached to the torque tube; and
   at least one mounting bracket assembly securing the at least one mounting rail to the torque tube, the mounting bracket assembly comprising:
     an upper clamp piece having a first member defining a tube insertion aperture and an open bottom space, the upper clamp piece including an upper partial fastener, wherein the first member has a slight return consisting of a protrusion that facilitates a snap attachment of the upper clamp piece onto the torque tube; and
     a lower clamp piece having a second member constituting bottom three sides of the mounting bracket assembly and having a lower partial fastener configured to mate with the upper partial fastener such that the lower clamp piece is attachable to the upper clamp piece.

8. The solar tracker assembly of claim 7 wherein when the lower clamp piece attaches to the upper clamp piece the open bottom space is closed.

9. The solar tracker assembly of claim 7 wherein the first member has a slight return such that the upper clamp piece forms a snap attachment on a torque tube.

10. The solar tracker assembly of claim 7 wherein one or both of the upper clamp piece and lower clamp piece provide a conductive ground path to a torque tube.

11. The solar tracker assembly of claim 7 wherein the upper partial fastener is a slot and the lower partial fastener is a hinge part.

12. The solar tracker assembly of claim 7 further comprising at least one angled reinforcement feature connected to the upper clamp piece.

13. The solar tracker assembly of claim 7 wherein the lower clamp piece further comprises two opposing support members configured to attach to the mounting rail.

14. A method of mounting solar modules, comprising:
    attaching at least one mounting rail to an upper clamp piece of a mounting assembly, the upper clamp piece having a slight return consisting of a protrusion facilitating a snap attachment of the upper clamp piece onto a torque tube and defining a tube insertion aperture and an open bottom space, the upper clamp piece including an upper partial fastener;

snapping the upper clamp piece over the vertical sides of a torque tube such that the upper clamp piece forms a snap attachment on the torque tube and stays in position on the torque tube until full assembly is completed; and attaching a lower clamp piece of the mounting assembly to the upper clamp piece by mating a lower partial fastener of the lower clamp piece with the upper partial fastener such that the open bottom space is closed and the at least one mounting rail is secured to the torque tube, the lower clamp piece constituting bottom three sides of the mounting assembly.

15. The method of claim 14 further comprising tightening a bolt and nut fastener to cinch the upper and lower clamp pieces around the torque tube.

16. The method of claim 14 wherein the lower clamp piece further comprises two opposing support members configured to attach to the mounting rail.

17. The method of claim 14 wherein the first member comprises two slight returns, each slight return being on an opposite side of the first member.

* * * * *